(12) United States Patent
Nallapa

(10) Patent No.: US 7,484,377 B2
(45) Date of Patent: Feb. 3, 2009

(54) METHOD AND APPARATUS FOR COOLING SYSTEM FAILURE DETECTION

(75) Inventor: Venkatapathi Raju Nallapa, West Bloomfield, MI (US)

(73) Assignee: Continental Automotive Systems US, Inc., Auburn Hills ( * ) Notice: Subject to any disclaimer, the term of this patent is extended or adjusted under 35 U.S.C. 154(b) by 598 days.

(21) Appl. No.: 11/003,146

(22) Filed: Dec. 3, 2004

(65) Prior Publication Data

US 2006/0021358 A1 Feb. 2, 2006

Related U.S. Application Data

(60) Provisional application No. 60/592,776, filed on Jul. 30, 2004.

(51) Int. Cl.
*F25B 49/00* (2006.01)
*G05D 23/32* (2006.01)
*F25D 23/12* (2006.01)

(52) U.S. Cl. ............... 62/127; 62/129; 62/158; 62/259.2; 361/688

(58) Field of Classification Search ............ 62/157, 62/126, 129, 230, 231, 259.2, 127, 158, 130; 236/46 C, 46 R, 94; 361/688
See application file for complete search history.

(56) References Cited

U.S. PATENT DOCUMENTS

| | | | | |
|---|---|---|---|---|
| 3,895,296 A * | 7/1975 | Boyd et al. | ............... | 324/156 |
| 5,446,362 A * | 8/1995 | Vanek et al. | ............... | 318/801 |
| 5,979,167 A * | 11/1999 | Kochavi et al. | ............... | 62/186 |
| 6,377,880 B1 * | 4/2002 | Kato et al. | ............... | 701/29 |
| 6,603,672 B1 | 8/2003 | Deng et al. | ............... | 363/37 |
| 6,636,429 B2 | 10/2003 | Maly et al. | ............... | 361/818 |
| 6,793,502 B2 | 9/2004 | Parkhill et al. | ............... | 439/66 |
| 6,844,701 B2 | 1/2005 | Chen et al. | ............... | 318/825 |
| 6,845,017 B2 | 1/2005 | Ahmed et al. | ............... | 361/775 |
| 7,082,772 B2 * | 8/2006 | Welch | ............... | 62/3.2 |
| 2002/0034088 A1 | 3/2002 | Parkhill et al. | ............... | 363/144 |
| 2002/0167828 A1 | 11/2002 | Parkhill et al. | ............... | 363/144 |
| 2003/0113600 A1 | 6/2003 | Wardrop et al. | ............... | 429/23 |
| 2005/0083714 A1 | 4/2005 | Zhu et al. | ............... | 363/17 |

OTHER PUBLICATIONS

Barbara H. Kenny, Robert D. Lorenz, Stator- and Rotor-Flux-Based Deadbeat Direct Torque Control of Induction Machines, vol. 39, No. 4, Jul./Aug. 2003.*

Texas Instruments Europe, "Field Oriented Control of 3-phase AC Motors", Lit. No. BPRA073, Feb. 1998, http://focus.ti.com/lit/an/bpra073/bpra073.pdf.

U.S. Appl. No. 10/738,926, filed Dec. 16, 2003, Maly et al.
U.S. Appl. No. 10/861,319, filed Jun. 4, 2004, Zhu.
U.S. Appl. No. 60/233,992, filed Sep. 20, 2000, Ahmed et al.
U.S. Appl. No. 60/233,993, filed Sep. 20, 2000, Ahmed et al.

(Continued)

Primary Examiner—Marc E Norman

(57) ABSTRACT

A system and method for detecting failure of a cooling system in an alternating current machine, such as a motor and/or a generator. For example, in one embodiment energy wasting is initiated and a failure is indicated if a temperature rises by more than a selected amount over a selected time period.

31 Claims, 6 Drawing Sheets

OTHER PUBLICATIONS

U.S. Appl. No. 60/233,994, filed Sep. 20, 2000, Ahmed et al.
U.S. Appl. No. 60/233,995, filed Sep. 20, 2000, Ahmed et al.
U.S. Appl. No. 60/233,996, filed Sep. 20, 2000, Ahmed et al.
U.S. Appl. No. 60/471,387, filed May 16, 2003, Flett et al.

* cited by examiner

METHOD AND APPARATUS FOR COOLING SYSTEM FAILURE DETECTION

BACKGROUND OF THE INVENTION

1. Field of the Invention

This disclosure generally relates to cooling systems for machines including induction motors and/or generators, and more particularly to a system and method for detecting a cooling system failure.

2. Description of the Related Art

The "fuel" powering an alternating current machine, such as a field-oriented induction motor, is current. This current may be divided into two components, torque current and flux current. Torque current may be viewed as that component of the current that generates motive force, or torque. Flux current may be viewed as that component of the current that generates magnetic flux in the rotor of the machine. Torque and flux currents in induction motors are discussed in more detail in co-pending U.S. patent application Ser. No. 10/345,872, filed Jan. 15, 2003, and entitled "OVERMODULATION SYSTEMS AND METHODS FOR INDUCTION MOTOR CONTROL" and in a February 1998 publication by Texas Instruments Europe bearing Literature No. BPRA073 and entitled Field Oriented Control of 3-Phase AC-Motors, which are incorporated herein by reference in their entirety.

Alternating current machines, such as induction motors and/or generators are often employed in electric and hybrid vehicles, which typically employ batteries and/or fuel cells as a power source. Current is supplied to windings through a power subsystem, typically comprising an inverter. Power subsystems typically employ power semiconductor devices, such as insulated gate bipolar transistors (IGBTs), metal oxide semiconductor field effect transistors (MOSFETs), and/or semiconductor diodes. These power semiconductor devices dissipate large amounts of heat during high power operation, creating thermal management problems which may limit the operating range, increase cost, increase size and/or weight, adversely effect efficiency, and/or reduce reliability of the power subsystem. Heat is also generated in the windings. This heat can cause the components to fail, and thus must be addressed. Cooling systems may employ a coolant. Exemplary cooling systems are described in co-pending U.S. patent application Ser. Nos. 10/738,926 filed Dec. 16, 2003 and entitled "POWER MODULE WITH HEAT EXCHANGE" and U.S. patent application Ser. No. 10/861,319 filed Jun. 4, 2004, and entitled "INTERLEAVED POWER CONVERTER," which are incorporated herein by reference in their entirety.

Cooling systems may not be installed properly or may fail or malfunction. For example, a fan may not be connected or may malfunction, a coolant line may be blocked or disconnected, or a coolant level may be too low. If the cooling system fails or malfunctions, damage to components of a system, such as the power module and/or the alternating current machine, may occur. Therefore it can be appreciated that a system and method to detect cooling system failure is highly desirable.

BRIEF SUMMARY OF THE INVENTION

In one aspect, a control system for controlling an alternating current machine comprises: a current control subsystem to generate current control signals; a cooling system control subsystem to generate cooling system control signals; a sensor system to sense an operating condition of the machine; and a cooling system failure detection subsystem communicatively coupled to the current control subsystem, the cooling system control subsystem and the sensor system, wherein the cooling system failure detection subsystem is configured to: selectively initiate a cooling system failure detection cycle; generate a control signal to cause generation of waste heat in the machine during the cooling system failure detection cycle; monitor the sensor system during the cooling system failure detection cycle; and terminate the cooling system failure detection cycle and generate a signal indicating a failure, if the monitoring of the sensor system indicates a change in the sensed operating condition exceeds a threshold value. In another aspect, the cooling system failure detection subsystem may be further configured to terminate the cooling system failure detection cycle and generate a signal indicating no failure, if the monitoring of the sensor system indicates a selected period of time has elapsed since the cooling system failure detection cycle was initiated and the cooling system failure detection cycle was not previously terminated.

In another aspect, an alternating current machine comprises: a rotor; and a control system for controlling the alternating current machine, the control system comprising: a current control subsystem to generate current control signals; a cooling system control subsystem to generate cooling system control signals; a sensor system to sense an operating condition of the machine; and a cooling system failure detection subsystem communicatively coupled to the current control subsystem, the cooling system control subsystem and the sensor system, wherein the cooling system failure detection subsystem is configured to: selectively initiate a cooling system failure detection cycle; generate a control signal to cause generation of waste heat in the machine during the cooling system failure detection cycle; monitor the sensor system during the cooling system failure detection cycle; terminate the cooling system failure detection cycle and generate a signal indicating a failure, if the monitoring of the sensor system indicates a change in the sensed operating condition exceeds a threshold value; and terminate the cooling system failure detection cycle and generate a signal indicating no failure, if the monitoring of the sensor system indicates a selected period of time has elapsed since the cooling system failure detection cycle was initiated and the cooling system failure detection cycle was not previously terminated.

In another aspect, a method of detecting a failure of a cooling system in an alternating current machine comprises: selectively initiating a test cycle; generating waste heat in the alternating current machine during the test cycle; monitoring a condition of the alternating current machine during the test cycle; terminating the test cycle and indicating a failure, if the monitored condition is outside a selected threshold range; and terminating the test cycle and indicating no failure, if a selected period of time has elapsed since the test cycle was initiated and the test cycle was not previously terminated.

In another aspect, a control system comprises: means for cooling a machine; means for controlling a rotatable component of the machine; and means for detecting a failure of the means for cooling a machine, communicatively coupled to the means for controlling a rotatable component of the machine, wherein the means for detecting a failure of the means for cooling a machine is configured to: selectively generate a control signal causing the means for controlling a rotatable component of the machine to generate waste heat in the machine; and monitor a response of the machine to the generated waste heat.

In another aspect, a computer-readable medium stores instructions for causing a control system to facilitate detection of a failed cooling system in an alternating current machine by: selectively initiating a test cycle; generating waste heat in the alternating current machine during the test cycle; monitoring a condition of the alternating current machine during the test cycle; terminating the test cycle and indicating a failure, if the monitored condition is outside a selected threshold range; and terminating the test cycle and indicating no failure, if a selected period of time has elapsed since the test cycle was initiated and the test cycle was not previously terminated.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments. However, one skilled in the art will understand that the present systems and methods may be practiced without these details. In other instances, well-known structures associated with cooling systems, power subsystems, bus systems, controllers, gate drivers, and/or alternating current machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Figure 1A:
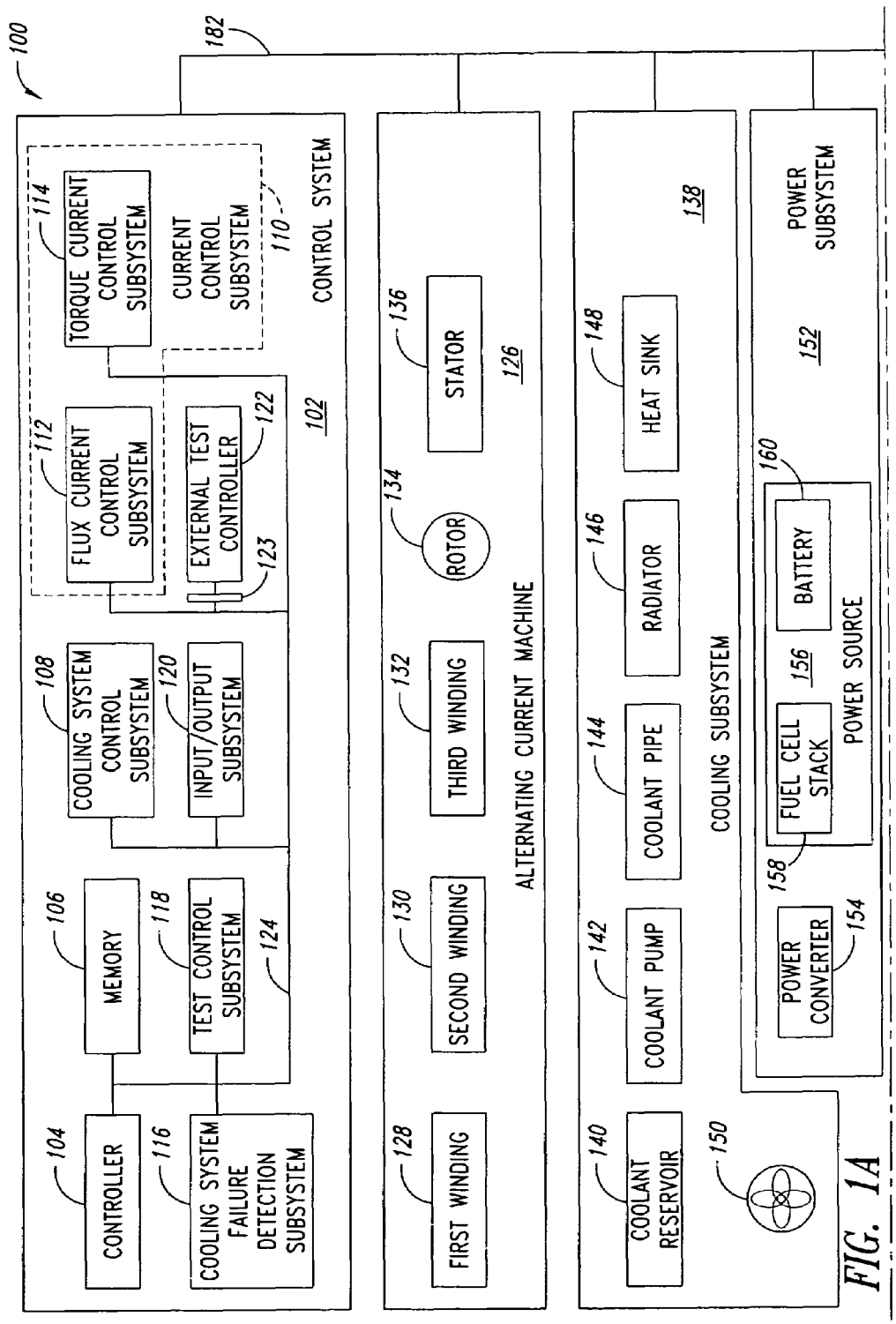
FIGS. 1A and 1B are a functional block diagram of a system incorporating an embodiment of a cooling system failure detection subsystem.
Figure 1B:
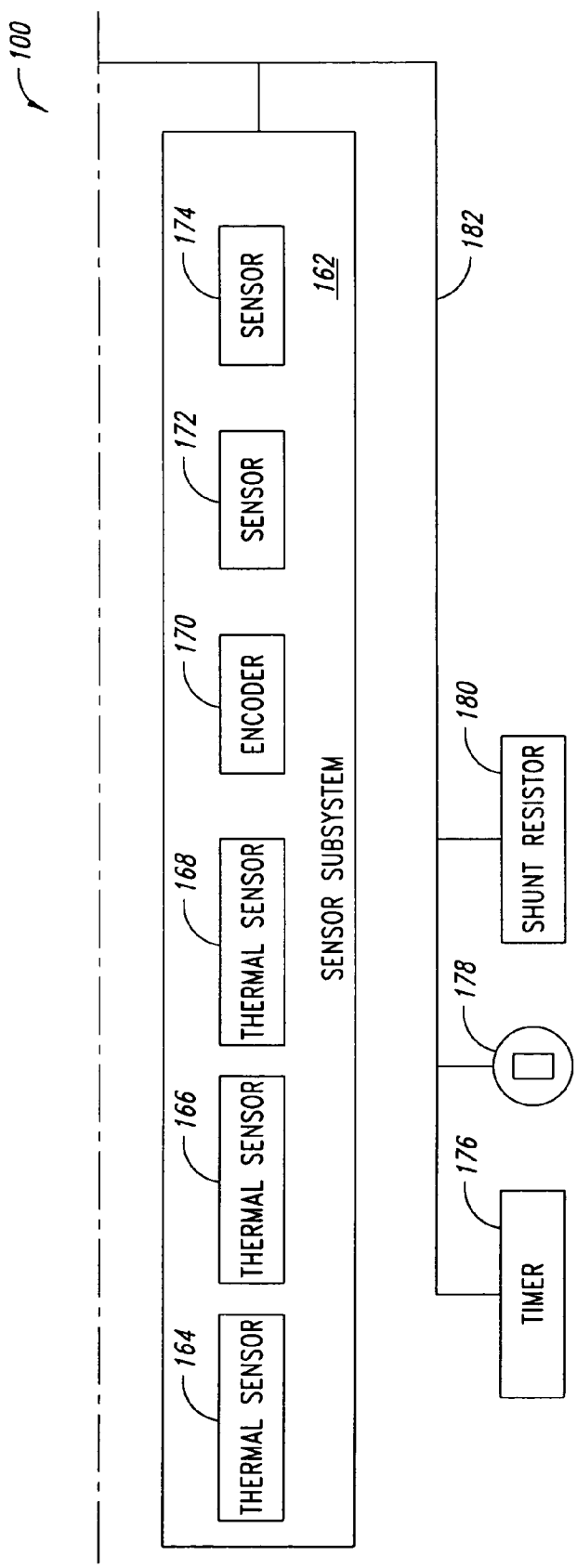

FIGS. 1A and 1B (collectively referred to herein as "FIG. 1") are a functional block diagram of a system 100 implementing an embodiment of a coolant failure detection strategy. The system 100 may be embodied in an electric and/or hybrid motor vehicle.

The system 100 comprises a control system 102, which controls operation of the system 100. The control system 102 may take the form of one or more processors, microcontrollers, firmware, subsystems, or other circuitry and components or combinations thereof, with or without associated memory.

In the embodiment illustrated in FIG. 1, the control system 102 comprises a controller 104, a memory 106, a cooling system control subsystem 108, a current control subsystem 110 comprising a flux current control subsystem 112 and a torque current control subsystem 114, a cooling system failure detection subsystem 116, a test control subsystem 118, an input/output subsystem 120, an external test controller 122, an external interface 123 and a control system bus 124. The external interface 123 provides a convenient means for connecting the control system 102 to the external test controller 122. The control system bus 124 may include a power bus, control bus, and status signal bus in addition to a data bus. For the sake of clarity, however, the various control system buses are illustrated in FIG. 1 as the control system bus 124.

The control system 102 may be implemented in a variety of ways, including as separate subsystems. The control system 102 may be implemented as a digital signal processor (DSP), an application-specific integrated circuit (ASIC), or the like, or as a series of instructions stored in a memory, such as the memory 106 and executed by a controller, such as the controller 104. Thus, software modifications to existing hardware may allow the implementation of the control system 102. Various subsystems, such as the cooling system failure detection subsystem 116, are identified as separate blocks in the functional block diagram of FIG. 1 because they perform specific functions that will be described in more detail below. These subsystems may not be discrete units but may be functions of a software routine, which will probably, but not necessarily, be separately callable and hence identifiable elements.

While the illustrated embodiment denotes a single controller 104, other embodiments may comprise multiple controllers. The memory 106 may comprise, for example, registers, read only memory ("ROM"), random access memory ("RAM"), flash memory and/or electronically erasable programmable read only memory ("EEPROM"), and may provide instructions and data for use by the control system 102.

The illustrated embodiment of the system 100 comprises an alternating current machine 126 comprising three windings 128, 130, 132, a rotor 134 and a stator 136.

The system 100 comprises a cooling subsystem 138 comprising a coolant reservoir 140, a coolant pump 142, a coolant pipe 144, a radiator 146, a heat sink 148, and a fan 150. The particular components and configuration of the cooling subsystem 138 may vary based on the particular application. For example, a cooling subsystem in an alternate embodiment may not contain a fan. Also, for example, the coolant may take a variety of forms, such as liquid, gas, vapor or a combination thereof.

The system 100 comprises a power subsystem 152 comprising a power converter 154, which may comprise an inverter circuit (see e.g. inverter circuit 200 in FIG. 2), and a power source 156, which as illustrated comprises a fuel cell stack 158 and a battery 160, but which may comprise any suitable power source, such as a connection to an AC power supply, a DC power supply and/or a combination thereof.

The system 100 comprises a sensor subsystem 162 comprising three thermal sensors 164, 166, 168, an encoder 170 and additional sensors 172, 174 for sensing various conditions of the system 100, such as temperatures and temperature changes inside and/or outside the power subsystem 152 and/or the windings 128, 130, 132, angular movement of the rotor 134, and/or levels of various control signals, such as levels of control signals generated by the current control subsystem 110. The exact components and configuration of the sensor subsystem 162 may vary depending on the particular application. For example, the sensor subsystem 162 may only have one thermal sensor and may have two or more encoders instead of three thermal sensors and one encoder as illustrated. The thermal sensors 164, 166, 168 may be, for example, thermometers and/or thermocouples.

The system 100 includes a timer 176, a keyed switch 178 and a shunt resistor 180. Various components of the system 100 are coupled together by a bus system 182, which may include a power bus, control bus, and status signal bus in addition to a data bus. For the sake of clarity, however, the various buses are illustrated in FIG. 1 as the bus system 182. Bus system connections and components within the control system 102, the alternating current machine 126, the cooling subsystem 138, the power subsystem 152, and the sensor subsystem 162 have been omitted for clarity.

In normal operation, the current control subsystem 110 generates control signals that cause the power subsystem 152 to supply torque and flux currents to the windings 128, 130, 132 of the alternating current machine 126, which allows the control system 102 to control the movement and/or the torque of the rotor 134 with respect to the stator 136. Normally, the current control subsystem 110 controls the relationship between the flux current and the torque current so as to maximize the torque produced and/or the efficiency of an alternating current machine, such as the alternating current machine 126 illustrated in FIG. 1.

The various components and subsystems of the system 100 illustrated in FIG. 1 may, in alternative embodiments have alternative configurations, may contain additional components, and/or may not contain all of the components and subsystems identified. For example, the timer 176 may be considered part of the control system 102, instead of a separate component of the system 100, and may be implemented as a series of software instructions. In another example embodiment, the cooling system control subsystem 108 may be considered part of the cooling subsystem 138.

Figure 2:
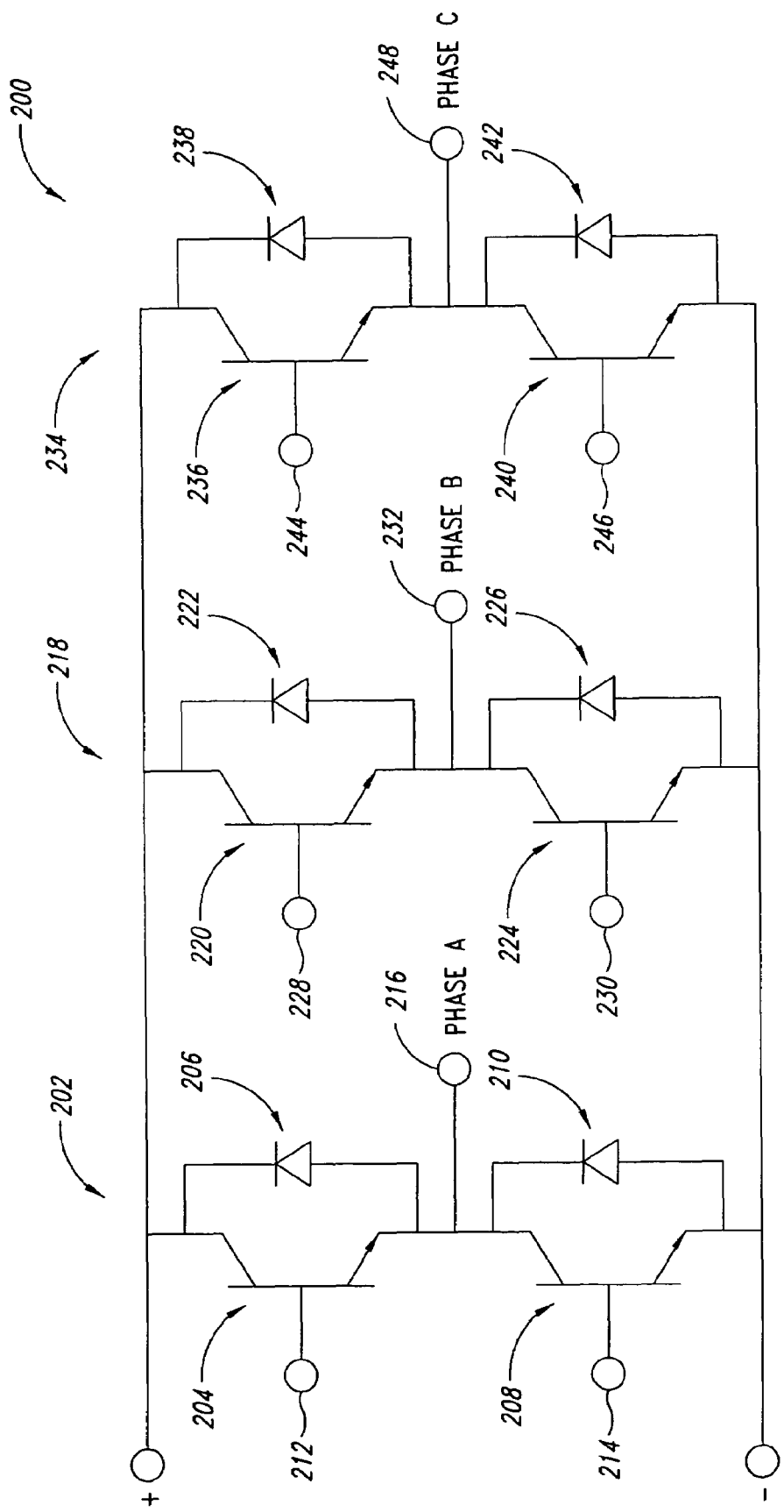
FIG. 2 is a schematic view of a three-phase inverter that can be employed in a power subsystem in the system of FIG. 1.

FIG. 2 is a schematic diagram of an embodiment of an inverter circuit 200 suitable for use in a power subsystem, such as the power subsystem 152 illustrated in FIG. 1. The inverter circuit 200 comprises a first leg 202 comprised of a first power transistor 204, a first diode 206, a second power transistor 208 and a second diode 210. The first and second power transistors 204, 208 comprise respective control terminals 212, 214, which may receive control signals from, for example, a flux current control subsystem such as the flux current control subsystem 112 illustrated in FIG. 1. The first leg 202 has an output terminal 216, which may supply current to a winding in a first mode of operation, such as the first winding 128 illustrated in FIG. 1.

The inverter 200 comprises a second leg 218 comprised of a third power transistor 220, a third diode 222, a fourth power transistor 224 and a fourth diode 226. The third and fourth power transistors 220, 224 comprise respective control terminals 228, 230, which may receive control signals from, for example, a flux current control subsystem such as the flux current control subsystem 112 illustrated in FIG. 1. The second leg 218 has an output terminal 232, which may supply current to a winding in a first mode of operation, such as the second winding 130 illustrated in FIG. 1.

The inverter comprises a third leg 234 comprised of a fifth power transistor 236, a fifth diode 238, a sixth power transistor 240 and a sixth diode 242. The fifth and sixth power transistors 236, 240 comprise respective control terminals 244, 246, which may receive control signals from, for example, a flux current control subsystem such as the flux current control subsystem 112 illustrated in FIG. 1. The third leg 234 has an output terminal 248, which may supply current to a winding in a first mode of operation, such as the third winding 132 illustrated in FIG. 1.

Figure 3:
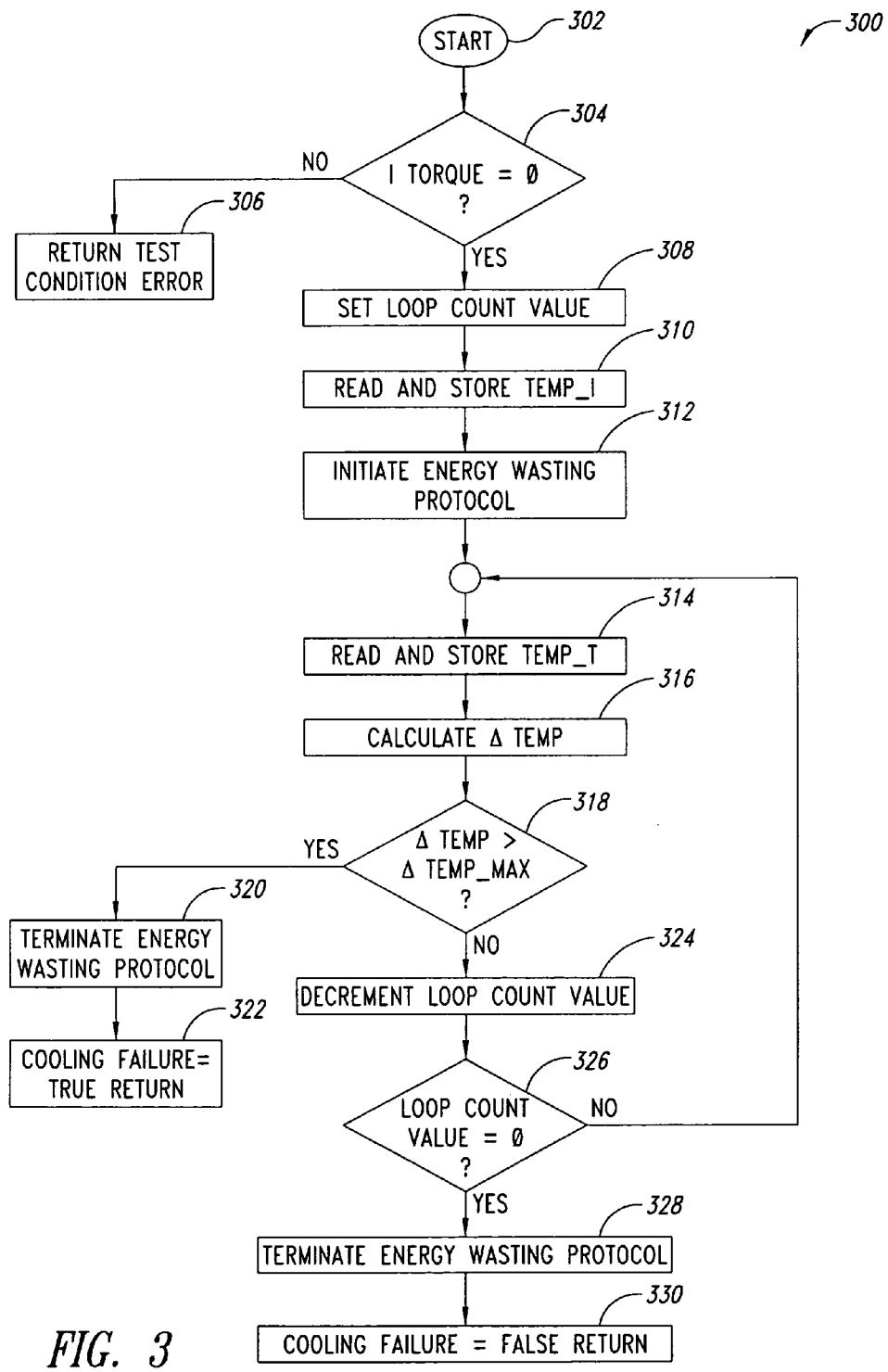
FIG. 3 is a flow diagram illustrating operation of an embodiment of a cooling system failure detection subroutine.

FIG. 3 is a flow diagram for the operation of a cooling system failure detection subroutine 300 that can be employed by a cooling system failure detection subsystem to detect a cooling system failure when an alternating current machine is not operating. For example, the subroutine 300 illustrated in FIG. 3 may be employed by the cooling system failure detection subsystem 116 of the system 100 of the embodiment illustrated FIG. 1. Operation of the subroutine 300 will be described with reference to the system 100 illustrated in FIG. 1 and the inverter circuit 200 illustrated in FIG. 2. The subroutine 300 can be employed with alternative embodiments of the system 100, and may, or may not, be modified for use with alternative embodiments of the system 100.

The subroutine 300 illustrated in FIG. 3 may be called in response to commands issued by the test control subsystem 118, which may, for example, issue commands to call the subroutine 300 in response to commands received from an external test controller 122 or in response to activation of the system 100. For example, the test control subsystem 118 may issue commands to call the cooling system failure detection subroutine 300 in response to a turning of the keyed switch 178. The cooling failure detection subroutine 300 could be employed as part of final assembly line testing of the system 100 to detect problems with the cooling subsystem 138 caused by failures such as a plugged coolant pipe 144, a low coolant level in a coolant reservoir 140 and/or a malfunctioning coolant pump 142.

The cooling system failure detection subroutine 300 starts at 302. At 304, the cooling system failure detection subsystem 116 verifies that the alternating current machine 126 is not operating by determining whether a torque current supplied to the alternating current machine 126 is zero. If the torque current supplied to the alternating current machine 126 is not zero, the cooling system failure detection subsystem 116 proceeds from 304 to 306, where it returns an error code indicating the test conditions were not satisfied. If the torque current supplied to the alternating current machine 126 is zero, the cooling system failure detection subsystem 116 proceeds from 304 to 308.

Additionally or alternatively, the cooling system failure detection subsystem 116 could verify that the alternating current machine 126 is not operating by checking other conditions of the system 100. For example, the cooling system failure detection subsystem 116 could determine whether a calculated speed was equal to zero. A calculated speed could be determined, for example, by processing data received from the encoder 170.

At 308 the cooling system failure detection subsystem 116 sets a loop counter value for a testing loop and proceeds to 310. The loop counter value is a function of the particular alternating current machine and test conditions, and is adjustable in an exemplary embodiment. For a motor vehicle with an induction motor tested under conditions where no torque current is supplied to the induction motor, a loop counter value set so that the testing loop will run for approximately 30 seconds may be sufficient to detect a failure of the cooling subsystem, such as the cooling subsystem 138 illustrated in FIG. 1.

At 310 the cooling system failure detection subsystem 116 reads and stores an initial temperature from a sensor. For example, the thermal sensor 164 could indicate an initial temperature of a leg of an inverter circuit, such as the temperature of leg 202 of inverter circuit 200. Alternatively, temperatures of and/or around other components could be read and stored. For example, thermal sensor 164 could indicate an initial temperature of the first winding 128 for reading and storage. Multiple temperatures could be read and stored. For example, thermal sensor 164 could indicate an initial temperature of a first inverter leg 202 and thermal sensor 166 could indicate an initial temperature of a second inverter leg 218. The cooling system failure detection subsystem 116 could read and store both initial temperatures. The number of temperatures sensed, read and stored, as well as the locations from which temperatures are sensed are functions of the specific circuit and cooling system topology.

Figure 5:
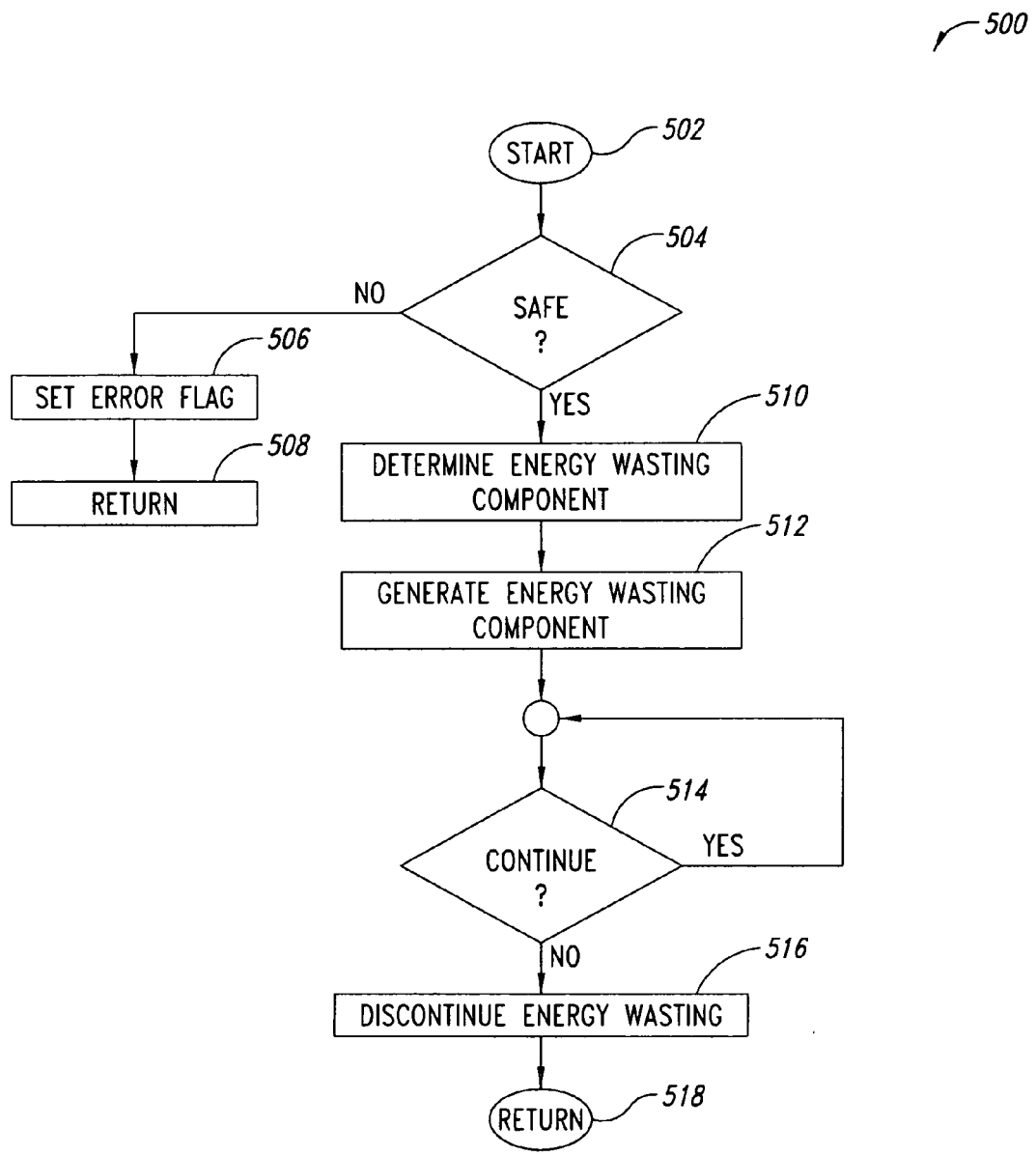
FIG. 5 is a flow diagram illustrating operation of an embodiment of an energy wasting protocol.

The cooling system failure detection subsystem 116 proceeds from 310 to 312, where an energy wasting protocol is initiated. An example energy wasting protocol is illustrated in FIG. 5, which is described in more detail below. Energy wasting protocols are also discussed in U.S. patent application Ser. No. 10/017,483 filed Dec. 14, 2001 and entitled "FUEL CELL SYSTEM SHUNT REGULATOR METHOD AND APPARATUS," which is incorporated herein by reference in its entirety. Another example energy wasting protocol would be to couple a shunt resistor across a voltage in a power subsystem, such as the shunt resistor 180 and the power subsystem 152 in FIG. 1.

The cooling system failure detection subsystem 116 proceeds from 312 to 314. At 314 the cooling system failure detection subsystem 116 reads and stores an updated temperature indicated by the sensor that provided the initial temperature at 310. Additionally or alternatively, multiple temperature readings could be stored, as discussed above with regard to act 310. The cooling system failure detection subsystem 116 proceeds from 314 to 316.

At 314, the cooling system failure detection subsystem 116 calculates a change in temperature by subtracting the initial temperature from the updated temperature. If, as discussed above, multiple initial and corresponding updated temperatures are stored, alternative methods of calculating the change in temperature may be employed. For example, the change in temperature could be calculated by subtracting an average of the stored initial temperatures from an average of the stored updated temperatures. Alternatively, the difference in one of the pairs of corresponding initial and updated temperatures could be selected as basis for the calculated change in temperature. For example, the pair with the greatest difference in temperature could be selected.

The cooling system failure detection subsystem 116 then proceeds from 316 to 318. At 318 the cooling system failure detection subsystem 116 determines whether the calculated change in temperature exceeds a selected threshold value. Energy wasting protocols can be expected to produce heat inside the system. For example, if an energy wasting protocol runs current through a leg of an inverter, such as the first leg 202 of the inverter 200, the temperature of and/or around the first leg 202 should increase. If the cooling subsystem 138 is functioning properly, the increase in temperature should be limited to an expected range. If the cooling subsystem 138 is not functioning properly, the increase in temperature should be expected to exceed a threshold value. The selected threshold value may depend, for example, on the energy wasting protocol selected, the location where a temperature is sensed, the method of calculating a change in temperature and/or the duration of the testing loop. For example, in a motor vehicle tested under conditions where the torque current is zero and the loop count corresponds to a testing cycle of approximately 30 seconds in duration, a threshold value of five degrees Celsius might be selected.

If the cooling system failure detection subsystem 116 determines at 318 that the calculated change in temperature exceeds the selected threshold value, the cooling system failure detection subsystem 116 proceeds from 318 to 320. At 320 the energy wasting protocol is terminated. The cooling system failure detection subsystem 116 proceeds from 320 to 322, where an indicator of a cooling system failure is set to TRUE and the cooling system failure detection subsystem 116 returns the value of the indicator and any other desired variables, such as stored temperature readings.

If the cooling system failure detection subsystem 116 determines at 318 that the calculated change in temperature does not exceed the selected threshold value, the cooling system failure detection subsystem 116 proceeds from 318 to 324. At 324 the cooling system failure detection subsystem 116 decrements the loop count value and proceeds to 326. At 326 the cooling system failure detection subsystem 116 determines whether the loop count value is zero.

If the loop count value is not zero, the cooling system failure detection subsystem 116 proceeds from 326 to 314. If the loop count value is zero, the cooling system failure detection subsystem 116 proceeds from 326 to 328. At 328 the energy wasting protocol is terminated. The cooling system failure detection subsystem 116 proceeds from 328 to 330. At 330 the cooling system failure detection subsystem 116 sets an indicator of a cooling system failure to FALSE and returns the value of the indicator and any other desired variables, such as stored temperature readings.

Embodiments of a cooling system failure detection subsystem 116 may perform other acts not shown in FIG. 3, may not all perform all of the acts shown in FIG. 3, or may perform the acts of FIG. 3 in a different order. For example, the subroutine 300 may be modified so that the cooling system failure detection subsystem 116 determines whether the cooling system is enabled before initiating the test loop. In another example, the loop count value may be incremented instead of decremented and/or a trigger value other than zero may be employed.

Figure 4:
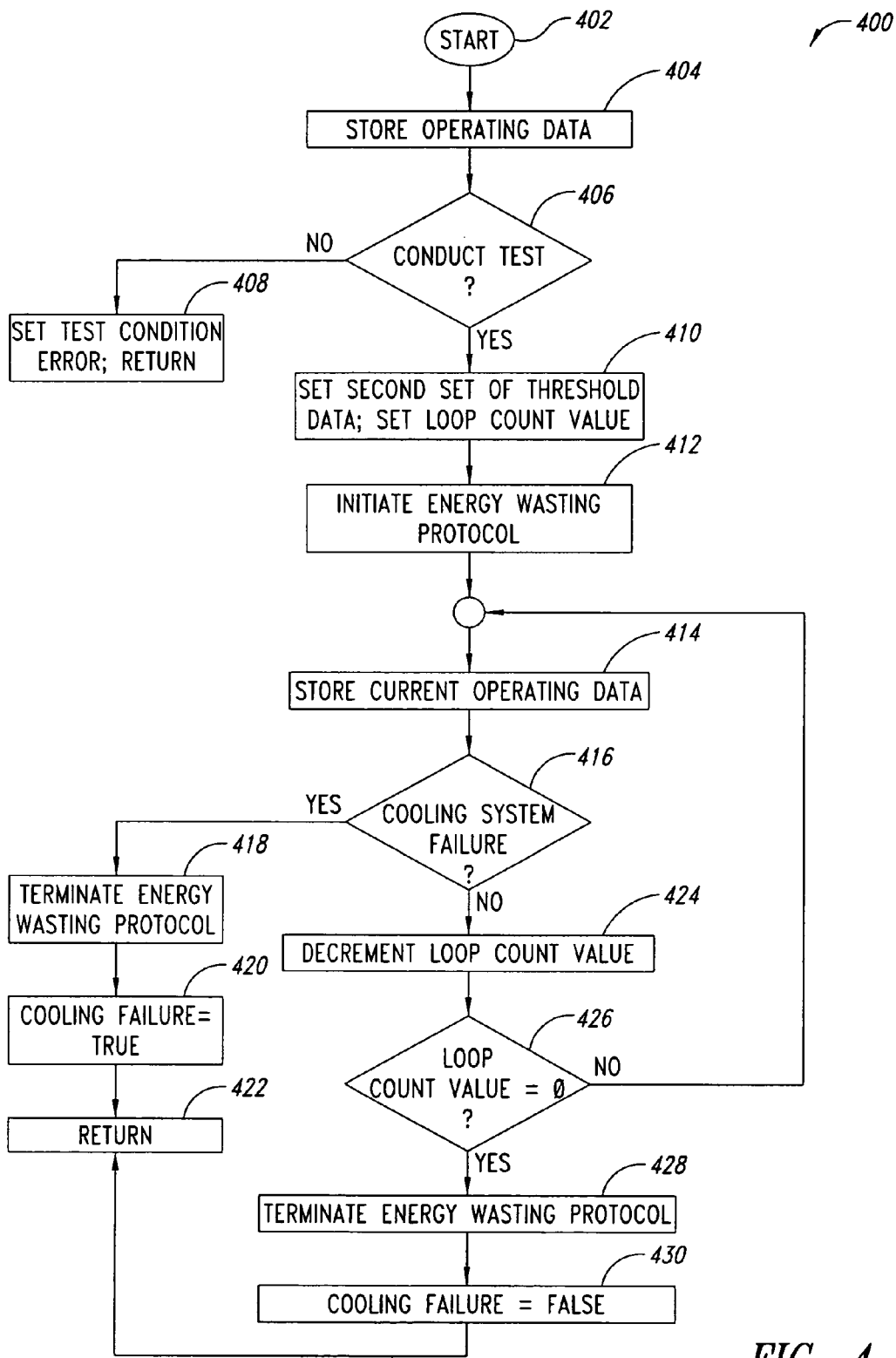
FIG. 4 is a flow diagram illustrating operation of an embodiment of a cooling system failure detection subroutine.

FIG. 4 is flow diagram for the operation of a cooling system failure detection subroutine 400 that can be employed by a cooling system failure detection subsystem to detect a cooling subsystem failure. The operation of the subroutine 400 will be described with reference to the embodiment of the system 100 and the embodiment of the inverter circuit 200 illustrated in FIGS. 1 and 2. For example, the subroutine 400 illustrated in FIG. 4 may be employed by the cooling system failure detection subsystem 116 illustrated in FIG. 1.

The subroutine 400 illustrated in FIG. 4, like the subroutine 300 illustrated in FIG. 3, may be called in response to commands issued by a test control subsystem, such as the test control subsystem 118 illustrated in FIG. 1, which may, for example, issue commands to call the subroutine 400 in response to commands received from an external test controller (see external test controller 122 illustrated in FIG. 1) or in response to activation of the system 100. For example, test control subsystem 118 may issue commands to call the cooling system failure detection subroutine 400 in response to a sensor output, such as a temperature measured by thermal sensor 164.

At 402, the subroutine starts. The cooling system failure detection subsystem 116 proceeds from 402 to 404. At 404, the cooling system failure detection subsystem 116 stores an initial data set related to the operating status of the system when the subroutine 400 is invoked. For example, referring to the components of FIG. 1, the stored initial data set may include the data corresponding to the outputs from the sensor subsystem 162, and/or the levels of control signals generated by other components of the system 100, such as control signals generated by the controller 104, by the current control subsystem 110, and/or by the external test controller 122. Alternatively, the data set may contain only a temperature reading from a thermal sensor, such as thermal sensor 166 of FIG. 1. The cooling system failure detection subsystem 116 proceeds from 404 to 406.

At 406 the cooling system failure detection subsystem 116 compares the stored data set gathered at 404 to a first set of corresponding threshold ranges and determines whether test conditions are satisfied. For example, referring to the components of FIG. 1, an output from thermal sensor 164 might indicate that a temperature of or around the first winding 128 is too high to use an energy wasting protocol to safely test the cooling subsystem 138, in which case the cooling system failure detection subsystem 116 would determine at 406 that the test conditions were not satisfied. Similarly, the output of the torque current control subsystem 114 may be such that it is undesirable for the first, second and third windings 128, 130, 132 to carry additional current associated with testing the cooling subsystem 138 using an energy wasting protocol, in which case the cooling system failure detection subsystem 116 would determine at 406 that the test conditions were not satisfied. Alternatively, a signal from the external test controller 122 might indicate that the test should be conducted only if the alternating current machine 126 is not operating.

If the cooling system failure detection subsystem 116 determines at 406 that the test conditions are not satisfied, the cooling system failure detection subsystem 116 proceeds from 406 to 408, where it returns an error code indicating the test conditions were not satisfied.

If the cooling system failure detection subsystem 116 determines at 406 that the test conditions are satisfied, the cooling system failure detection subsystem 116 proceeds from 406 to 410. At 410 the cooling system failure detection subsystem 116 sets a loop counter value for a testing loop and selects a second set of threshold data. The cooling system failure detection subsystem 116 proceeds from 410 to 412, where it initiates a selected energy wasting protocol. The particular energy wasting protocol selected is a function of the particular application, the particular alternating current machine 126 and/or the conditions of operation, and may depend, for example, on the data set gathered at 404.

Any parameter of the system 100, and/or combination of parameters, that can be expected to behave in response to the generation of waste heat in a first manner if the cooling subsystem 138 is functioning properly and to behave in response to the generation of waste heat in a second manner if the cooling subsystem 138 is not functioning properly can serve as the basis for selecting the second set of threshold data. In addition, the optimum loop counter value, and the optimum second set of threshold data may vary depending on the operating conditions of the system when the subroutine is invoked and the energy wasting protocol employed.

For example, if the subroutine 400 is called to test a non-operating alternating current machine 126 at ambient temperature, the loop counter value might correspond to a testing loop with a duration of thirty seconds, the second set of threshold data might correspond to a change in temperature at a first location of less than five degrees Celsius and a first energy wasting protocol might be selected. Alternatively, if the subroutine 400 is called to test an operating alternating current machine 126 with a initial torque current of 25 amps and a temperature at a second location of 20 degrees Celsius, the loop counter value might correspond to a testing loop of 500 milliseconds in duration, the second set of threshold data might correspond to a temperature of less than twenty-two degrees Celsius at the second location and a torque current of between 24 and 25 amps, and a second energy wasting protocol might be selected. A look-up table implemented in a read only memory can be employed, for example, to select the second set of threshold data.

The cooling system failure detection subsystem 116 proceeds from 412 to 414, where the cooling system failure detection subsystem 116 stores a current data set related to a current operating status of the system 100. The cooling system failure detection subsystem 116 proceeds from 414 to 416. At 416, the cooling system failure detection subsystem 116 determines whether the cooling subsystem 138 has failed by comparing the stored current data set to the second set of threshold data.

If the cooling system failure detection subsystem 116 determines at 416 that the cooling subsystem 138 has failed, the cooling system failure detection subsystem 116 proceeds from 416 to 418. At 418, the energy wasting protocol is terminated and the cooling system failure detection subsystem 116 proceeds to 420. At 420, the cooling system failure detection subsystem 116 sets an indicator of a cooling system failure to TRUE and proceeds to 422. A system, such as system 100 of FIG. 1, can then take appropriate action in response to the cooling subsystem 138 failure, such as issuing commands to turn off the torque and flux currents.

If the cooling system failure detection subsystem 116 determines at 416 that the cooling subsystem 138 has not failed, the cooling system failure detection subsystem 116 proceeds from 416 to 424. At 424, the cooling system failure detection subsystem 116 decrements the loop counter value and proceeds to 426.

At 426 the cooling system failure detection subsystem 116 determines whether the loop counter value is zero. If the loop counter value at 426 is not zero, the cooling system failure detection subsystem 116 returns to 414. If the loop counter value at 426 is zero, the cooling system failure detection subsystem 116 proceeds to 428, where the energy wasting protocol is terminated and the cooling system failure detection subsystem 116 proceeds to 430. At 430, an indicator of a cooling subsystem 138 failure is set to FALSE and the cooling system failure detection subsystem 116 proceeds to 422.

At 422, the value of the cooling system failure indicator and any other desired variables are returned. Embodiments of a cooling system failure detection subsystem 116 implementing a cooling system failure detection subroutine 400 may perform other acts not shown in FIG. 4, may not all perform all of the acts shown in FIG. 4, or may perform the acts of FIG. 4 in a different order. For example, the subroutine 400 may be modified to determine whether an external test controller (see external test controller 122 of FIG. 1) has generated a signal indicating that a particular energy wasting protocol should be employed. In another example, the loop counter value may be incremented instead of decremented and/or may employ a trigger value other than zero.

FIG. 5 is a flow diagram for a subroutine 500 implementing an energy wasting protocol that can be employed by a cooling system failure detection subsystem, such as the cooling system failure detection subsystem 116 illustrated in FIG. 1. Operation of the subroutine 500 will be described with respect to the system 100 illustrated in FIG. 1 and the inverter circuit 200 illustrated in FIG. 2. Normally, the relationship between a flux current and a torque current is controlled so as to maximize the torque produced and/or the efficiency of an alternating current machine, such as the alternating current machine 126 illustrated in FIG. 1. A flux current in excess of the amount required may generate excess heat in the alternating current machine 126 and/or the power subsystem 152, without contributing significantly to the production of torque. This may be referred to as an energy wasting protocol when it is done deliberately.

At 502, the subroutine 500 starts. The cooling system failure detection subsystem 116 proceeds from 502 to 504. At 504 the cooling system failure detection subsystem 116 determines whether it is safe to initiate an energy wasting protocol by comparing a stored set of threshold values corresponding to safe operating conditions of the system 100 to a data set corresponding to the current operating conditions of the system 100. For example, the cooling system failure detection subsystem 116 may compare a stored threshold temperature to a temperature read by a thermal sensor, such as the thermal sensor 168 of FIG. 1. If the cooling system failure detection subsystem 116 determines at 504 that it is not safe to initiate energy wasting, it proceeds from 504 to 506. At 506, the cooling system failure detection subsystem 116 sets an error flag to TRUE and proceeds to 508, where the cooling system failure detection subsystem 116 returns the value of the error flag and any other desired variable. If the cooling system failure detection subsystem 116 determines at 504 that it is safe to initiate energy wasting, the cooling system failure detection subsystem 116 proceeds from 504 to 510.

At 510, the cooling system failure detection subsystem 116 determines the energy wasting component of a flux current that will produce a selected amount of energy wasting. For example, the energy wasting necessary to generate an increase in temperature of more than five degrees Celsius over a thirty second period in the windings 128, 130, 132 of the non-operating alternating current machine 126 without a functioning cooling subsystem 138 might correspond to a flux current of approximate 300 amps in the windings 128, 130, 132. In an alternative example, energy wasting to generate a change in temperature of two degrees Celsius over ten seconds in a region surrounding a first leg of an inverter, such as inverter leg 202 of FIG. 2, in an operating alternating current machine 126 might correspond to an increase in an existing flux current of 100 amps in a corresponding winding, such as winding 128 of FIG. 1.

The cooling system failure detection subsystem 116 proceeds from 510 to 512. At 512 the cooling system failure detection subsystem 116 generates commands to cause the system 100 to generate the determined amount of flux current in the appropriate windings, such as the first, second and third windings 128, 130, 132 of FIG. 1. The cooling system failure detection subsystem 116 proceeds from 512 to 514.

At 514, the cooling system failure detection subsystem 116 determines whether it is appropriate to continue the energy wasting protocol. For example, the cooling system failure detection subsystem 116 may check whether an instruction to stop the energy wasting protocol has been issued by a calling subroutine, such as subroutine 400 illustrated in FIG. 4. The cooling system failure detection subsystem 116 could also check at 514 whether it is safe to continue the energy wasting. The cooling system failure detection subsystem 116 could also employ a timer, such as timer 176 illustrated in FIG. 1, to stop the energy wasting protocol after a selected period of time has elapsed. If the cooling system failure detection subsystem 116 determines at 514 that it is appropriate to continue the energy wasting protocol, the cooling system failure detection subsystem 116 returns to 514. If the cooling system failure detection subsystem 116 determines at 514 that it is not appropriate to continue the energy wasting protocol, the cooling system failure detection subsystem 116 proceeds from 514 to 516.

At 516, the cooling system failure detection subsystem 116 issues commands causing the system 100 to discontinue the energy wasting protocol and proceeds to 518, where the cooling system failure detection subsystem 116 returns control to the calling program or terminates the subroutine 500. Embodiments of an energy wasting subroutine 500 implemented by a cooling system failure detection subsystem 116 may perform other acts not shown in FIG. 5, may not all perform all of the acts shown in FIG. 5, or may perform the acts of FIG. 5 in a different order. For example, the subroutine may be modified so that the cooling system failure detection subsystem 116 determines whether an external test controller (see external test controller 122 of FIG. 1) has generated a signal indicating that a particular energy wasting protocol should not be employed.

Although specific embodiments of and examples for the present coolant system failure detection systems and methods are described herein for illustrative purposes, various equivalent modifications can be made without departing from the spirit and scope of the invention, as will be recognized by those skilled in the relevant art after reviewing the specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to commonly assigned U.S. patent application Ser. No. 10/738,926 filed Dec. 16, 2003, and entitled "POWER MODULE WITH HEAT EXCHANGE"; commonly assigned U.S. patent application Ser. No. 10/345,872 filed Jan. 15, 2003, and entitled "OVERMODULATION SYSTEMS AND METHODS FOR INDUCTION MOTOR CONTROL"; commonly assigned U.S. patent application Ser. No. 10/861,319 filed Jun. 4, 2004, and entitled "INTERLEAVED POWER CONVERTER"; commonly assigned U.S. patent application Ser. No. 10/017,483 filed Dec. 14, 2001, and entitled "FUEL CELL SYSTEM SHUNT REGULATOR METHOD AND APPARATUS"; and a February 1998 Texas Instruments Europe publication bearing Literature No. BPRA073 and entitled *Field Oriented Control of 3-Phase AC-Motors*, are incorporated herein by reference, in their entirety. Aspects of the embodiments described herein can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification. Accordingly, the claims are not limited by the disclosure.

The invention claimed is:

1. A control system for controlling an alternating current machine, the control system comprising:
    a current control subsystem to generate current control signals;
    a cooling system control subsystem to generate cooling system control signals;

a sensor system to sense an operating condition of the machine; and a cooling system failure detection subsystem communicatively coupled to the current control subsystem, the cooling system control subsystem and the sensor system, wherein the cooling system failure detection subsystem is configured to:

selectively initiate a cooling system failure detection cycle;

generate a control signal to cause generation of waste heat by generating a second control signal causing the current control subsystem to generate a control signal to increase a flux current without increasing a torque current in the machine during the cooling system failure detection cycle;

monitor the sensor system during the cooling system failure detection cycle; and terminate the cooling system failure detection cycle and generate a signal indicating a failure, if the monitoring of the sensor system indicates a change in the sensed operating condition exceeds a threshold value.

2. The control system of claim 1 wherein the cooling system failure detection subsystem is further configured to terminate the cooling system failure detection cycle and generate a signal indicating no failure, if the monitoring of the sensor system indicates a selected period of time has elapsed since the cooling system failure detection cycle was initiated and the cooling system failure detection cycle was not previously terminated.

3. The control system of claim 1 wherein the operating condition of the machine is a temperature.

4. The control system of claim 1 wherein the operating condition of the machine is an average of a plurality of temperatures.

5. The control system of claim 1 wherein the operating condition of the machine is an average of a plurality of temperatures.

6. The control system of claim 1 wherein the cooling system failure detection subsystem is further configured to disable initiation of the cooling system failure detection cycle based upon a determination that the current control subsystem is generating a current control signal to generate a torque current.

7. The control system of claim 1 wherein the cooling system failure detection subsystem is configured to initiate the cooling system failure detection cycle in response to a command issued by an external test controller.

8. The control system of claim 1 wherein the cooling system failure detection subsystem is configured to initiate the coolong system failure detection cycle when the alternating current machine is not operating.

9. The control system of claim 1 wherein the cooling system failure detection subsystewm is configured to monitor the sensor system during the cooling system failure detection cycle when alternating current machine is not operating.

10. An alternating current machine comprising:

a rotor; and a control system for controlling the alternating current machine, the control system comprising:

a current control subsystem to generate current control signals;

a cooling system control subsystem to generate cooling system control signals;

a sensor system to sense an operating condition of the machine; and a cooling system failure detection subsystem communicatively coupled to the current control subsystem, the cooling system control subsystem and the sensor system, wherein the cooling system failure detection subsystem is configured to:

selectively initiate a cooling system failure detection cycle;

generate a control signal to cause generation of waste heat in the machine during the cooling system failure detection cycle;

monitor the sensor system during the cooling system failure detection cycle;

terminate the cooling system failure detection cycle and generate a signal indicating a failure, if the monitoring of the sensor system indicates a change in the sensed operating condition exceeds a threshold value; and terminate the cooling system failure detection cycle and generate a signal indicating no failure, if the monitoring of the sensor system indicates a selected period of time has elapsed since the cooling system failure detection cycle was initiated and the cooling system failure detection cycle was not previously terminated.

11. The machine of claim 10 wherein the sensor system comprises an encoder to generate a signal indicating movement of the rotor and the control system is configured to disable the cooling system failure detection subsystem if the signal indicating movement of the rotor indicates movement of the rotor.

12. The machine of claim 10 wherein the machine is configured to respond to the control signal to increase a flux current by increasing the flux current by approximately 300 amps.

13. The The alternating curent machine of claim 10 wherein the at least action is a generation of an increase in flux current without operating the alternating current machine.

14. The the alternating current machine of claim 10 wherein the at least one action is a generation of an increase in flux current without a coressponding increase in torque current.

15. A method of detecting a failure of a cooling system in a machine, the method comprising:

selectively initiating a test cycle;

generating waste heat in the alternating current machine during the test cycle;

monitoring a condition of the alternating current machine during the test cycle;

terminating the test cycle and indicating a failure, if the monitored condition is outside a selected threshold range; and terminating the test cycle and indicating no failure, if a selected period of time has elapsed since the test cycle was initiated and the test cycle was not previously terminated.

16. The method of claim 15 wherein monitoring a condition of the alternating current machine during the test cycle comprises monitoring a change in a temperature.

17. The method of claim 16 wherein the selected threshold range is a change in temperature of less than five degrees Celsius.

18. The method of claim 15, further comprising disabling initiation of a test cycle based upon a determination that a torque current is being generated.

19. The method of claim 15 wherein monitoring a condition of the alternating current machine comprises monitoring a plurality of thermal sensors.

20. The method of claim 15, wherein the machine is an electric vehicle.

21. The method of claim 15, further comprising disabling initiation of a test cycle if based upon detection of movement of a rotor.

22. The method of claim 15 wherein the test cycle is initiated in response to a command received from an external test controller.

23. The method of claim 15 wherein the selected period of time has a duration of approximately thirty seconds.

24. The method of claim 15, further comprising generating control signals in response to an indication of a failure.

25. A control system comprising:
   means for cooling a machine;
   means for controlling a rotatable component of the machine; and
   means for detecting a failure of the means for cooling a machine, communicatively coupled to the means for controlling a rotatable component of the machine, wherein the means for detecting a failure of the means for cooling a machine is configured to:
   selectively generate a control signal causing the means for controlling a rotatable component of the machine to generate waste heat in the machine by increasing a flux current; and
   monitor a response of the machine to the generated waste heat.

26. The control system of claim 25 wherein the means for detecting a failure of the means for cooling a machine is configured to generate a signal indicating the means for cooling a machine is functioning properly if the monitored response of the machine is within a selected threshold response.

27. The control system of claim 26 wherein the monitored response is a change in a temperature.

28. The control system of clain 25 wherein the waste heat is generated by the increase in flux current without a corresponding increase in torque current.

29. The control system of claim 28 wherein the waste heat is generated without increasing torque current.

30. The control system of claim 25 wherein the waste heat is generated based. upon a determination that the machine is not operating.

31. A computer-readable medium storing instructions for causing a control system to facilitate detection of a failed cooling system in an alternating current machine by:
   selectively initiating a test cycle;
   generating waste heat in the alternating current machine during the test cycle;
   monitoring a condition of the alternating current machine during the test cycle;
   terminating the test cycle and indicating a failure, if the monitored condition is outside a selected threshold range; and
   terminating the test cycle and indicating no failure, if a selected period of time has elapsed since the test cycle was initiated and the test cycle was not previously terminated.

* * * * *